US012587797B2

(12) United States Patent
Kamkar-Parsi et al.

(10) Patent No.: US 12,587,797 B2
(45) Date of Patent: Mar. 24, 2026

(54) METHOD FOR OPERATING A HEARING SYSTEM AND HEARING SYSTEM

(71) Applicant: Sivantos Pte. Ltd., Singapore (SG)

(72) Inventors: Homayoun Kamkar-Parsi, Erlangen (DE); Martin Bouchard, Cantley (CA); Hala As'Ad, Nepean (CA)

(73) Assignee: Sivantos Pte. Ltd., Singapore (SG)

( * ) Notice: Subject to any disclaimer, the term of this patent is extended or adjusted under 35 U.S.C. 154(b) by 211 days.

(21) Appl. No.: 18/502,148

(22) Filed: Nov. 6, 2023

(65) Prior Publication Data

US 2024/0080633 A1 Mar. 7, 2024

Related U.S. Application Data

(63) Continuation of application No. PCT/EP2021/063891, filed on May 25, 2021.

(51) Int. Cl.
*H04R 25/00* (2006.01)

(52) U.S. Cl.
CPC ......... *H04R 25/505* (2013.01); *H04R 25/405* (2013.01); *H04R 25/407* (2013.01); *H04R 25/552* (2013.01); *H04R 2225/43* (2013.01); *H04R 2430/23* (2013.01)

(58) Field of Classification Search
CPC ............ H04R 2225/43; H04R 2430/23; H04R 2430/25; H04R 25/405; H04R 25/407; H04R 25/505; H04R 25/552
USPC .......................................................... 381/312
See application file for complete search history.

(56) References Cited

U.S. PATENT DOCUMENTS

| | | | |
|---|---|---|---|
| 10,904,679 B2 | 1/2021 | As'ad et al. | |
| 2011/0293108 A1 | 12/2011 | Mejia et al. | |
| 2013/0136271 A1 | 5/2013 | Buck et al. | |
| 2020/0204932 A1 | 6/2020 | As'ad et al. | |

FOREIGN PATENT DOCUMENTS

| | | |
|---|---|---|
| EP | 2884763 B1 | 5/2019 |

OTHER PUBLICATIONS

PCT/EP2021/0638911. Written Opinion of International Search Authority (Year: 2022).*

* cited by examiner

*Primary Examiner* — Phylesha Dabney
(74) *Attorney, Agent, or Firm* — Laurence A. Greenberg; Werner H. Stemer; Ralph E. Locher

(57) ABSTRACT

A method operates a hearing system that has first and second hearing devices. In the first hearing device, a first reference signal and a first auxiliary signal are generated from an environment sound collected by microphones. A first pre-processed signal is generated by applying a direction-sensitive pre-processing to the first reference and auxiliary signals using first reference and first auxiliary pre-processing coefficients. For the microphones, a respective first reference head related transfer function and first auxiliary head related transfer function are provided, and a first head related transfer function is derived from the first reference and first auxiliary pre-processing coefficients and from the first reference and auxiliary head related transfer functions. For the second hearing device a second pre-processed signal is generated using second microphones, and a second position related transfer function is provided. A direction-sensitive signal processing task is performed on the first and second pre-processed signals.

15 Claims, 4 Drawing Sheets

METHOD FOR OPERATING A HEARING SYSTEM AND HEARING SYSTEM

CROSS-REFERENCE TO RELATED APPLICATION

This application is a continuation, under 35 U.S.C. § 120, of copending International Patent Application PCT/EP2021/063891, filed May 25, 2021, which designated the United States; the prior application is herewith incorporated by reference in its entirety.

FIELD AND BACKGROUND OF THE INVENTION

The invention is related to a method for operating a hearing system containing at least a first hearing device and a second hearing device. The first hearing device containing at least a first reference microphone and a first auxiliary microphone, and the second hearing device having at least a number of microphones. Wherein for the first hearing device, a first reference signal and a first auxiliary signal are generated from an environment sound by the first reference microphone and the first auxiliary microphone, respectively, and a first pre-processed signal is generated by applying a direction-sensitive pre-processing to the first reference and auxiliary signals. For the second hearing device, a second pre-processed signal is generated. The second pre-processed signal being representative of the environment sound, by means of the number of microphones, and wherein a direction-sensitive signal processing task is performed on the first pre-processed signal and the second pre-processed signal.

In many applications of binaural hearing systems with two hearing devices, a directional signal processing task is implemented by some type of directional pre-processing for each hearing device, and using the pre-processed signals for finally performing the desired direction-dependent signal processing task. For example, blocking matrices may be generated from the microphone signals of the microphones in the hearing devices, using different combinations of the microphones of the full microphone array consisting of all of the hearing system's microphones, and the information of the different blocking matrices may be used for direction-dependent noise reduction or source localization.

This in particular holds for those binaural hearing systems in which each of the hearing devices contains at least two or even more microphones. In such a case, very often, local pre-processing is applied to the several microphone signals obtained from an environment sound for each hearing device. For example, a single hearing device of the binaural hearing system may comprise two microphones, and the resulting two microphone signals are being locally pre-processed by some direction-dependent algorithm, to generate a local signal which already may show some noise reduction or other kind of enhancement (e.g., by attenuating signals from the back hemisphere of the user of the system). A direction-dependent signal processing task, such as source localization or beamforming, may then be performed by using the corresponding local pre-processed signals from each side.

For a direction-dependent pre-processing of these microphone signals, the relative positions and the resulting level differences and sound delays for the involved microphones have to be taken into account, as well as the position of the microphones with respect to the user's head. This can be done via a head related transfer function (HRTF) for each microphone, which represents the propagation of a generic sound signal from a certain spatial direction towards the corresponding microphone and also takes into account shadowing effects coming from the head and/or the pinna of the user. However, in case that an overall direction-dependent signal processing task shall also be implemented by use of one or more HRTFs, the local pre-processing may introduce certain inaccuracy with respect to the transfer functions to be used for the global directional processing.

SUMMARY OF THE INVENTION

It is therefore an object of the invention to provide a method for operating a hearing system, which allows for a direction-dependent local pre-processing of the signals of the hearing system's individual devices without distorting the performance of a global direction-dependent signal processing using the hearing device's output signals for the global processing. It is furthermore the object of the invention to provide a hearing system containing certain hearing devices, which allows for a local pre-processing in the hearing devices prior to a global, direction-dependent signal processing based on signals generated from the local pre-processing in each hearing device with as little spatial distortion as possible.

According to the invention, the first object is achieved by a method for operating a hearing system, the hearing system containing a first hearing device and a second hearing device. The first hearing device containing at least a first reference microphone and a first auxiliary microphone. The second hearing device containing at least a number of microphones. Wherein for the first hearing device, a first reference signal and a first auxiliary signal are generated from an environment sound by the first reference microphone and the first auxiliary microphone, respectively, and a first pre-processed signal is generated by applying a direction-sensitive pre-processing to the first reference and auxiliary signals by means of corresponding first reference and first auxiliary pre-processing coefficients, respectively. Wherein for the second hearing device, a second pre-processed signal is generated by means of the number of microphones, the second pre-processed signal being representative of the environment sound, and a second position related transfer function is provided, representative of the propagation of a generic sound signal from the given angle towards the second hearing device when the second hearing device is mounted at a specific location, in particular, on the users body.

According to the method, for the first reference microphone and the first auxiliary microphone, a respective first reference head related transfer function and first auxiliary head related transfer function are provided, representative of the propagation of a generic sound signal from a given angle towards the corresponding first reference and first auxiliary microphone when the first hearing device is mounted on the head of a user, and a first head related transfer function, representative of the propagation of a generic sound signal from the given angle towards the first hearing device when the first hearing device is mounted on the head of the user, is derived from the first reference and first auxiliary pre-processing coefficients and from the first reference and auxiliary head related transfer functions. Wherein a direction-sensitive signal processing task is performed on the first pre-processed signal and the second pre-processed signal, using the first head related transfer function and the second position related transfer function for said task. Embodiments of particular advantage, which may be inventive in their own right, are outlined in the depending claims and in the following description.

According to the invention, the second object is achieved by a hearing system, containing a first hearing device with at least a first reference microphone and a first auxiliary microphone, and a second hearing device with at least a number of microphones. The hearing system further has a control unit with at least one signal processor, wherein the hearing system is configured to perform the method for operating as given above.

The hearing system according to the invention shares the advantages of the method for operating a hearing system according to the invention. Particular assets of the method and of its embodiments may be transferred, in an analogous way, to the hearing system and its embodiments, and vice versa.

Generally, a hearing system is understood as meaning any system which provides an output signal that can be perceived as an auditory signal by a user or contributes to providing such an output signal. In particular, the hearing system may have means adapted to compensate for an individual hearing loss of the user or contribute to compensating for the hearing loss of the user. The hearing devices may be given as hearing aids that can be worn on the body or on the head, in particular on or in the ear, or that can be fully or partially implanted. The hearing system may comprise other types of hearing devices, such as ear-buds. In particular, a device whose main aim is not to compensate for a hearing loss, for example a consumer electronic device (mobile phones, MP3 players, so-called "hearables" etc.), may also be considered a hearing system.

Within the present context, a hearing device can be understood as a small, battery-powered, microelectronic device configured to be worn behind or in or elsewhere at the human ear or at or on another body part by a user. A hearing device in the sense of the invention contains a battery, a microelectronic circuit having a signal processor, and the specified number of microphones. Wherein a microphone shall be understood as any form of acoustoelectric input transducer configured to generate an electric signal from an environment sound. The signal processor is preferably a digital signal processor.

In particular, the first hearing device is a hearing device to be worn by the user on and/or at one of his ears during operation of the hearing system and in particular providing an output sound signal to the respective hearing of the ear. According to variations, the first hearing device need not comprise a traditional loudspeaker as output transducer. Examples that do not comprise a traditional loudspeaker are typically found in the field of hearing aids in the stricter sense, i.e., hearing devices designed and configured to correct for a hearing impairment of the user, and output transducers may be also be given by cochlear implants, implantable middle ear hearing devices (IMEHD), bone-anchored hearing aids (BAHA) and various other electro-mechanical transducer-based solutions including, e.g., systems based on using a laser diode for directly inducing vibration of the eardrum. However, a hearing aid may also comprise a traditional loudspeaker as output transducer.

The second hearing device may be configured as a hearing device to be worn by the user at or in the other ear (than the first hearing device), and may comprise an acoustic output transducer as described for the case of the first hearing device. Thus, the hearing system, in particular, may be given by a binaural hearing system with two hearing devices, configured to be worn by the user on and/or at different ears during operation.

The first hearing device and the second hearing device, however, may also be given by different types of devices. The second hearing device may be given as an additional or auxiliary device of the hearing system not necessarily located at the other ear, but, e.g., worn around the neck, or on a wrist. The second hearing device, thus, need not be a hearing device with an output transducer of its own, but may be a device that, using its microphone(s), provides one or more input signals for signal processing, such that a resulting signal from the signal processing using also the signals generated from the second hearing device, is reproduced to the hearing of the user by the output transducer of the first hearing device.

Apart from the first reference microphone and the first auxiliary microphone, the first hearing device may also comprise one or even more further microphones, each of which configured to generate a respective signal from the environment sound. Preferably, the second hearing device contains an equal number of microphones as the first hearing device, however, this is not a necessary condition for operation of the hearing system according to the method. Preferably, during operation, the first and second hearing device are located noticeably apart from each other. In particular, each microphone of the hearing system may have an omni-directional characteristic.

The first reference microphone may in particular be given by a front microphone and the first auxiliary microphone by a back microphone of the first hearing device, i.e., due to the positioning of the first hearing device for operation of the hearing system, the first reference microphone is located before the first auxiliary microphone with respect to a frontal direction of the first hearing device.

Preferably, the first pre-processed signal is generated from the first reference signal and the first auxiliary signal by applying the first reference pre-processing coefficient to the first reference signal, and the first auxiliary pre-processing coefficient to the first auxiliary signal, preferably as multiplications in each case. Thus, the first reference signal in particular may be generated as a weighted sum of the first reference and auxiliary signal, weighted by the first reference and auxiliary pre-processing coefficients. The first reference and auxiliary pre-processing coefficients may be determined by imposing a set of spatial conditions onto the resulting first pre-processed signal, such as a maximal attenuation in a certain spatial direction, or a minimal signal power with the constraint of a lower-bound on the gain in a certain direction (e.g., a specific direction of preference for the first hearing device, such as a frontal direction). In this respect, the first pre-processed signal may in particular be a beamformer signal based on the combination (e.g., as a weighted sum) of the first reference signal and the first auxiliary signal as an example. The second pre-processed signal is generated by means of the number of microphones of the second hearing device in the sense that the second hearing device may comprise only one microphone, and the respective microphone signal, generated from the environment sound by said microphone of the second hearing device is then also used as the second pre-processed signal, or may receive single-channel pre-processing, such as frequency dependent amplification for generating the second pre-processed signal.

However, the second hearing device may also contain more than one microphone. In particular, the second pre-processed signal may be generated in a similar way as the first pre-processed signal, i.e., the second hearing device may comprise a second reference microphone and a second auxiliary microphone, each of which generating a respective signals from the environment sound which are being applied to a direction-sensitive pre-processing by means of corresponding pre-processing coefficients, just as in the case for the first pre-processed signal and its generation from the first reference and auxiliary signal. In particular, the second pre-processed signal is representative of the environment sound, in the sense that it contains signal contributions from one or more signals directly generated by a microphone from the environment sound.

By means of the head related transfer functions, in particular, propagation time differences (that may cause phase differences in frequency domain) between the hearing devices or also between the microphones of a single hearing device may be taken into account (by respective phase factors with respect to a global phase frame), as well as other possible differences in the propagation from the generic sound source located at said given angle towards one or another microphone or towards one or another hearing device, in particular, the shadowing by the head (and possibly the pinna) of the user, possibly causing also level differences.

The second position related transfer function may also be given by a head related transfer function, in case the second hearing device is configured to be worn by the user at or on his head. In case that the second hearing device is configured for a different position on the user's body, e.g., worn at the chest using a strap around the neck, or worn at the wrist, the second position related transfer function has to be adapted accordingly, in particular with respect to the shadowing effects (and possible phase and level differences in case of two or more microphones in the second device) that may occur at this position.

The direction-sensitive signal processing task may be any possible task using at least two input signals generated at different locations, and preferably also respective transfer functions for each location, which processes and/or extracts any kind of spatial acoustic information encoded in these at least two input signals. In particular, the task may be given by the generation of the output signal using signal contributions of the first and second pre-processed signal, in particular by a weighted sum of said pre-processed signals, where in the weighting coefficients are given by the first head related transfer function and second position related transfer function, respectively. The direction-sensitive signal processing task may, however, also be given by a control operation in the sense that a control signal or, more generally, a control information is obtained, such as the location of a dominant sound source, or similar control operations.

In particular, for the case that the direction-sensitive signal processing task is performed according to a known algorithm that uses two input signals and the corresponding head and/or position related transfer functions as additional coefficients for spatial processing, the present method allows for taking into account the pre-processing that occurs locally on the level of the first hearing device. The first head related transfer function may be generated in a way that the distortion of spatial information due to the local pre-processing in the first hearing device may be minimized. As a result, the spatial accuracy for the direction-sensitive signal processing task may be crucially improved.

In the described way, the invention provides for a compensation or correction of the individual HRTFs in the first hearing device that allows taking into account a local directional pre-processing. Such an HRTF compensation then may be used in any directional processing algorithm which by design uses an HRTF information, in particular binaural processing.

Preferably, the number of microphones of the second hearing device comprises at least a second reference microphone and a second auxiliary microphone. Wherein for the second hearing device, a second reference signal and a second auxiliary signal are generated from the environment sound by the second reference microphone and the second auxiliary microphone, respectively, the second pre-processed signal is generated by applying a direction-sensitive pre-processing to the second reference signal and second auxiliary signal by means of corresponding second reference and second auxiliary pre-processing coefficients, respectively, for the second reference microphone and the second auxiliary microphone, a respective second head related transfer function and second auxiliary head related transfer function are provided, representative of the propagation of a generic sound signal from the given angle towards the corresponding second reference and second auxiliary microphone when the second hearing device is mounted on the head of said user, and a second head related transfer function is given as the second position related transfer function by derivation from the second reference and second auxiliary pre-processing coefficients and from the second reference and auxiliary head related transfer functions, in particular, by a linear function of these four quantities. One of the two hearing devices is to be worn by the user on or at his left ear during operation of the hearing system, while the other hearing device is to be worn on or at his right ear.

In this respect, the local pre-processing in the first and second hearing device can be performed by similar or even the same algorithms. However, the second pre-processed signal may differ from the first pre-processed signal even in case of equal pre-processing algorithms due to the mentioned head shadowing effects. These differences are then also reflected by the corresponding first and second head related transfer functions.

In an embodiment, the first head related transfer function is used as a correction to the first reference or first auxiliary head related transfer function for the direction-sensitive signal processing task. This in particular means that the direction-sensitive signal processing task is being performed according to a known algorithm that depends on the input of a head related transfer function, wherein typically, either the first reference or first auxiliary head related transfer function is being used as such an input. Using the first head related transfer function instead then serves as a correction to possible errors (or spatial distortion) that may originate from using one of the first reference or first auxiliary head related transfer function while also using the first pre-processed signal (instead of the first reference or auxiliary signal) as a further input for the algorithm performing said task. In particular, it is beneficial to use the second head related transfer function as a correction to the second reference or second auxiliary head related transfer function, in case that the direction-sensitive signal processing task is being performed according to a known algorithm that depends on the input of a head related transfer function from the second hearing device. Most preferably, for performing said task, all involved head related transfer functions are normalized with respect to either the first head related transfer function or the second head related transfer function.

In an embodiment, as said direction-sensitive signal processing task, an angle of a sound source is determined and/or a beamformer signal is generated, the beamformer signal containing signal contributions from the first and second pre-processed signal. For these tasks, the method shows particular advantages in that the spatial distortion is minimized by matching the first head related transfer function to the corresponding first pre-processed signal. Advantageously, for determining the angle of a sound source, a set of spatial filters is generated by means of said first and second head related transfer functions, each of the spatial filters forming an attenuation notch in space towards a different angle. For a source localization with said filters, using the first—and possibly the second—head related transfer function generated according to the method from the respective local pre-processing coefficients, yields a particularly high accuracy.

In an embodiment, the first head related transfer function and the first pre-processed signal have the same functional dependence on the first reference and first auxiliary pre-processing coefficients, respectively. In particular, this may also apply, mutatis mutandis, to the second position or head related transfer function and the second pre-processed signal. This means: the first pre-processed signal may be described as a function of the first reference and first auxiliary pre-processing coefficients, and of the first reference and auxiliary signals. Then, the first head related transfer function may be described as a function of the first reference and first auxiliary pre-processing coefficients, and of the first reference and auxiliary head related transfer functions, wherein the dependence on the first reference and first auxiliary pre-processing coefficients matches the respective dependence of the first pre-processed signal. Preferably, the first head related transfer function may be described by exactly the same function as the first pre-processed signal, substituting the first reference and auxiliary microphone signals by the first reference and auxiliary head related transfer functions.

Advantageously, the first head related transfer function $H_1$ is derived as a linear combination of the first reference and auxiliary head related transfer functions $h_{1r}$, $h_{1a}$, weighted by the first reference and first auxiliary pre-processing coefficients $w_{1r}$, $w_{1a}$, respectively, i.e., $H_1=h_{1a}w_{1a}+h_{1r}w_{1r}$, wherein the first pre-processed signal $sp_1$ is generated as a linear combination of the first reference and auxiliary signals $s_{1r}$, $s_{1a}$, weighted by the first reference and first auxiliary pre-processing coefficients $w_{1r}$, $w_{1a}$, i.e., $sp_1=s_{1a}s_{1a}+s_{1r}s_{1r}$. In particular, this may also apply, mutatis mutandis, to the second head related transfer function $H_2$ and the second pre-processed signal $sp_2$.

In an embodiment, for generating the first pre-processed signal in the first hearing device, fixed first reference and first auxiliary pre-processing coefficients are used. In particular, the fixed coefficients may result in a maximal attenuation for a fixed direction (with respect to the direction of preference). Preferably, fixed second reference and second auxiliary pre-processing coefficients may be used for generating the second pre-processed signal in the second hearing device. For fixed coefficients, all processing information for the direction-sensitive signal processing task may be known in the first hearing device, so that in order to perform the task in the first hearing device, only the second pre-processed signal is further needed from the second hearing device, resulting in low transmission overhead.

In another embodiment, for generating the first pre-processed signal in the first hearing device, adaptive first reference and first auxiliary pre-processing coefficients are used, in dependence on the first reference signal and/or the first auxiliary signal. In particular, these coefficients may be derived by an adaptive beamforming process that is, e.g., configured to minimize the total power of the first pre-processed signal subject to a restriction of a minimal power in the direction of preference (the frontal direction of the first hearing device).

Preferably, for generating the second pre-processed signal in the second hearing device, adaptive second reference and second auxiliary pre-processing coefficients are used, in dependence on the second reference and/or second auxiliary signal, in particular, in an analogous way to the first pre-processed signal. Wherein for performing the direction-sensitive signal processing task in the first hearing device, said adaptive second reference and second auxiliary pre-processing coefficients are transmitted from the second hearing device to the first hearing device. This allows for a broader variety of local pre-processing. In order to be able to perform said task in the first hearing device, the adaptive coefficients of the second hearing device are required, as well as the second reference and auxiliary head related transfer functions; the latter, however, may be stored in the first hearing device in advance.

Advantageously, for the first hearing device, a first frontal direction is defined as the direction from the first auxiliary microphone towards the first reference microphone, wherein the first pre-processed signal is generated by applying a direction-sensitive pre-processing to the first reference and auxiliary signals by means of the first reference and first auxiliary pre-processing coefficients, respectively, in a way that the first pre-processed signal shows a maximal attenuation for a generic sound signal originating from an angular range of [+90°, +270°], preferably of [+125°, +235°], with respect to the first frontal direction. The angular range is preferably understood in terms of a vector with an origin in the first hearing device and an angle from the mentioned range with respect to the frontal direction. Wherein the assumption is made that the size of the hearing device, and thus, possible differences in the choice of the origin of the vector, are negligible in comparison to the distance of the sound source.

To this end, the first pre-processed signal preferably is generated by means of an adaptive beamforming process employing said first reference and first auxiliary pre-processing coefficients. Preferably, the second pre-processed signal shows analogous restrictions onto its maximal attenuation. This means that the adaptive first reference and auxiliary coefficients are to be derived subject to the mentioned restriction for the direction of maximal attenuation or minimal gain. This essentially restricts notches on the first (and possibly the second) pre-processed signal to the back hemisphere (with respect to the frontal direction), which further helps to reduce spatial distortion for the direction-sensitive signal processing task.

Other features which are considered as characteristic for the invention are set forth in the appended claims.

Although the invention is illustrated and described herein as embodied in a method for operating a hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
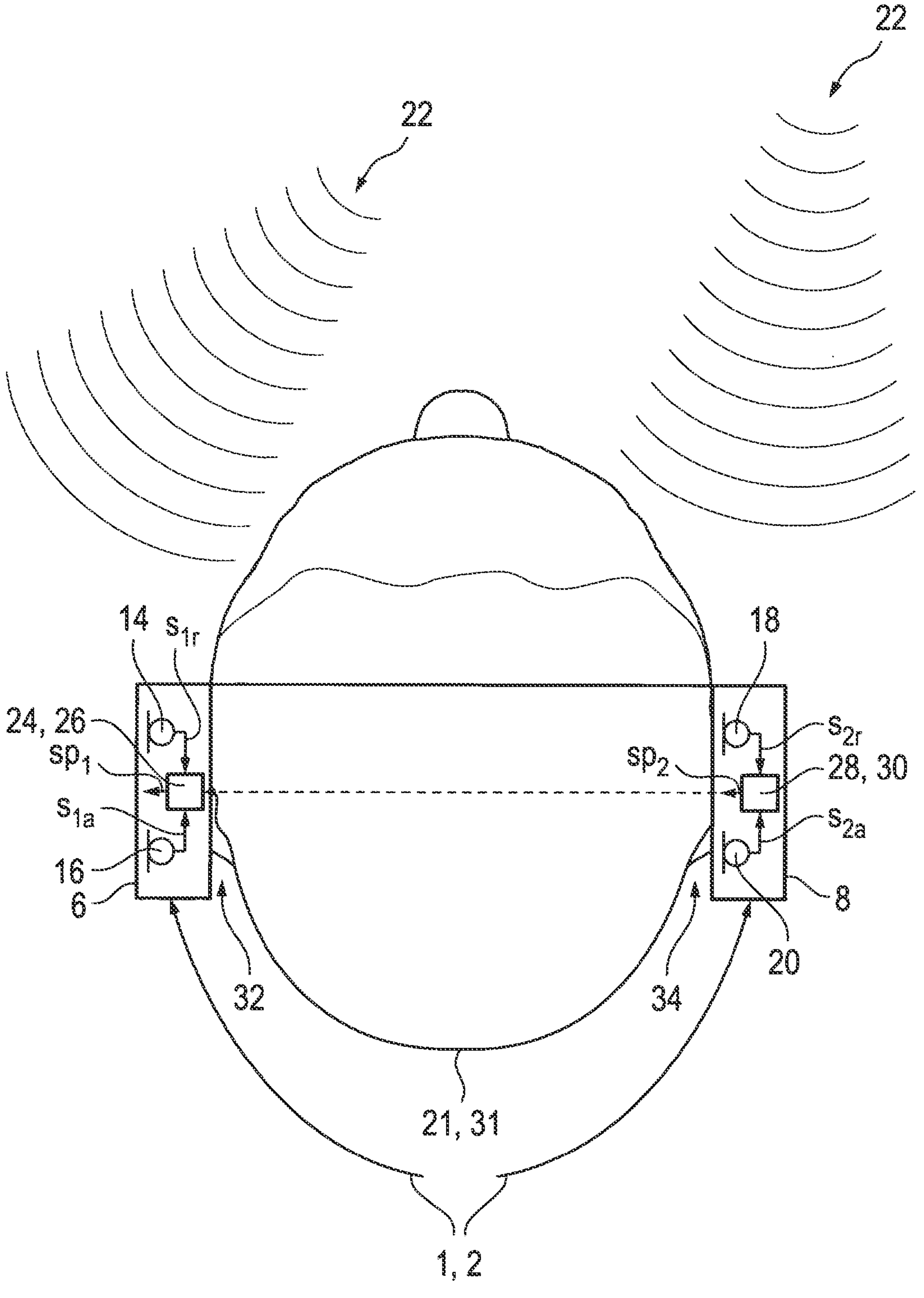
FIG. 1 is a schematic block diagram of a binaural hearing system.

Parts and variables corresponding to one another are provided with the same reference numerals in each case of occurrence for all figures.

Referring now to the figures of the drawings in detail and first, particularly to FIG. 1 thereof, there is shown a schematic block diagram for a signal flow in a hearing system 1. The hearing system 1 is given by a binaural hearing system 2 which contains a first hearing device 6 and a second hearing device 8. However, in different embodiments, the second hearing device 8 might also be given by some other type of external device. The binaural hearing system in an embodiment may also comprise an external control device (not shown), though such an external control device is optional. The first hearing device 6 has a first reference microphone 14 and a first auxiliary microphone 16, the second hearing device 8 contain a second reference microphone 18 and a second auxiliary microphone 20.

The first reference microphone 14 may be given by a front microphone and the first auxiliary microphone 16 by a back microphone of the first hearing device 6, i.e., during normal operation of the hearing system 1, due to the positioning of the first hearing device 6 for operation, the first reference microphone 14 is located before the first auxiliary microphone 16 with respect to a frontal direction (not shown). A similar arrangement may hold for the second reference microphone and auxiliary microphone 18, 20 in the second hearing device 8.

Each of the mentioned microphones has an a priori omni-directional characteristic in the sense that the microphones are configured and designed to have an equal sensitivity for all directions. In a way not shown in detail, the first hearing device 6 further contains a control unit with at least one signal processor, and an output transducer for converting an output signal into an output sound that it presented to the hearing of a user 21 of the binaural hearing system 12. Likewise, the second hearing device 8 also contains a similar control unit and an output transducer.

An environment sound 22 is converted into a first reference signal $s_{1r}$ by the first reference microphone 14, into a first auxiliary signal $s_{1a}$ by the first auxiliary microphone 16, into a second reference signal $s_{2r}$ by the second reference microphone 18, and into a second auxiliary signal as to a by the second auxiliary microphone 20. In a way yet to be described, a direction-sensitive pre-processing 24 is applied to the first reference signal sir and the first auxiliary signal $s_{1a}$, and as a result, a first pre-processed signal $sp_1$ is generated. The direction-sensitive pre-processing in the present case is given by a first local beamformer 26. In a similar way, a direction-sensitive pre-processing 28, given by a second local beamformer 30, is applied to the second reference signal $s_{2r}$ and the second auxiliary signal $s_{2a}$, and as a result, a second pre-processed signal $sp_2$ is generated. The second pre-processed signal $sp_2$ is transmitted to the first hearing device 6 in order to perform said direction-sensitive signal processing task.

For operation of the binaural hearing system 2, the user 21 is wearing the binaural hearing system 12 on his head 31, i.e., he is wearing the first hearing device 6 on the left side 32 of his head 31, on or at his left ear, and the second hearing device 8 on the right side 34 of his head 31, on or at his right ear. Obviously, the assignment of first and second hearing device to left and right ear may be interchanged.

Figure 2:
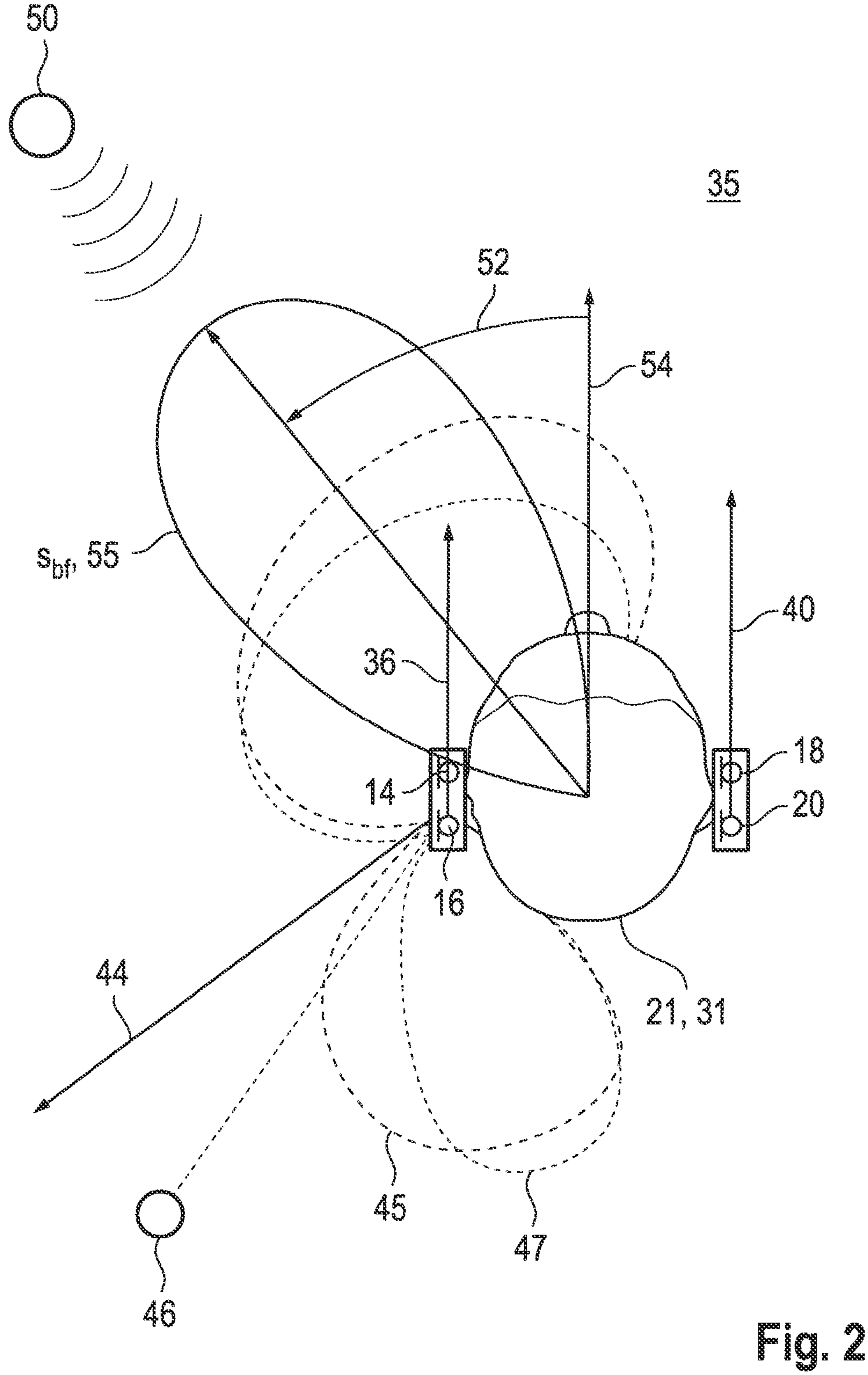
FIG. 2 shows a schematic top view of a user of the binaural hearing system of FIG. 1 in an environment with different sound sources.

In FIG. 2, a schematic top view shows the location of the user 21 wearing the binaural hearing system 2 of FIG. 1, and other sound sources in an environment 35. The first hearing device 6 has a first frontal direction 36, as a direction of preference for its microphones, i.e., for the first reference microphone 14 and the first auxiliar microphone 16. The second hearing device 8 has a second frontal direction 40 as a direction of preference for its microphones, i.e., for the second reference microphone 18 and the second auxiliary microphone 20. Depending on the specific design of the first and second hearing device 6, 8 and on the resulting positions on the head 31 of the user 21, the first and second frontal directions 36, 40 may coincide (i.e., the respective vectors if the first and second frontal direction 36, 40 may be parallel); however, it is also possible that due to design and construction of the binaural hearing system 2, the first and second direction 36, 40 are different.

The direction-sensitive pre-processing 24 on the first reference signal sir and the first auxiliary signal $s_{1a}$, as shown in FIG. 1, may either be fixed or adaptive. In the case of a fixed direction-sensitive pre-processing 24, a maximal attenuation is always achieved for a fixed first null direction 44. A corresponding directional characteristic 45 for the resulting first pre-processed signal $sp_1$ is shown (dashed lines). However, the first pre-processed signal $sp_1$ may also be formed such that it always adapts to attenuate the interferer 46, regardless of his position, yielding a corresponding directional characteristic 47 (dotted line). In an analogous way, the direction-sensitive pre-processing 28 of FIG. 1 on the second reference signal $s_{2r}$ and the second auxiliary signal $s_{2a}$ for generating the second pre-processed signal $sp_2$ may either be fixed, in particular giving a fixed second null direction (not shown), or adaptive with respect to an interferer. Preferably, the first and second pre-processed signal sp1, sp2 are either both generated by fixed direction-sensitive pre-processing 24, 28, or both generated by adaptive direction-sensitive pre-processing 24, 28. In the latter case, due to shadowing effects of the head 31 and also of the ears, the direction-sensitive pre-processing 28 of the second hearing device 8 may adapt to a different interferer than the direction-sensitive pre-processing 24 of the first hearing device 6.

The direction-sensitive signal processing task to be performed by the binaural hearing system 2 according to FIG. 1 may be given by the localization of a dominant sound source 50 in the environment 35 of the binaural hearing system 12, i.e., by finding an angular source direction 52 for the sound source 50 with respect to a global direction of preference 54 for the binaural hearing system 2, the global direction of preference being derived from the first and second frontal directions 36, 40 (e.g., as the angular mean direction). The task may also be given by generating a beamformer signal $s_{bf}$, preferably pointing towards the dominant sound source 50, to be converted into an output sound by an output transducer of the first hearing device 6. In FIG. 2, the beamformer signal $s_{bf}$ is represented by the main lobe of its respective directional characteristic 55 (solid line).

In an analogous way, a direction-sensitive signal processing task may be performed in the second hearing device 8, based on the (local) second pre-processed signal $s_{p2}$, and on the (remote) first pre-processed signal sp1 that has been transmitted from the first hearing device 6 to the second hearing device 8 for performing the task.

Figure 3:
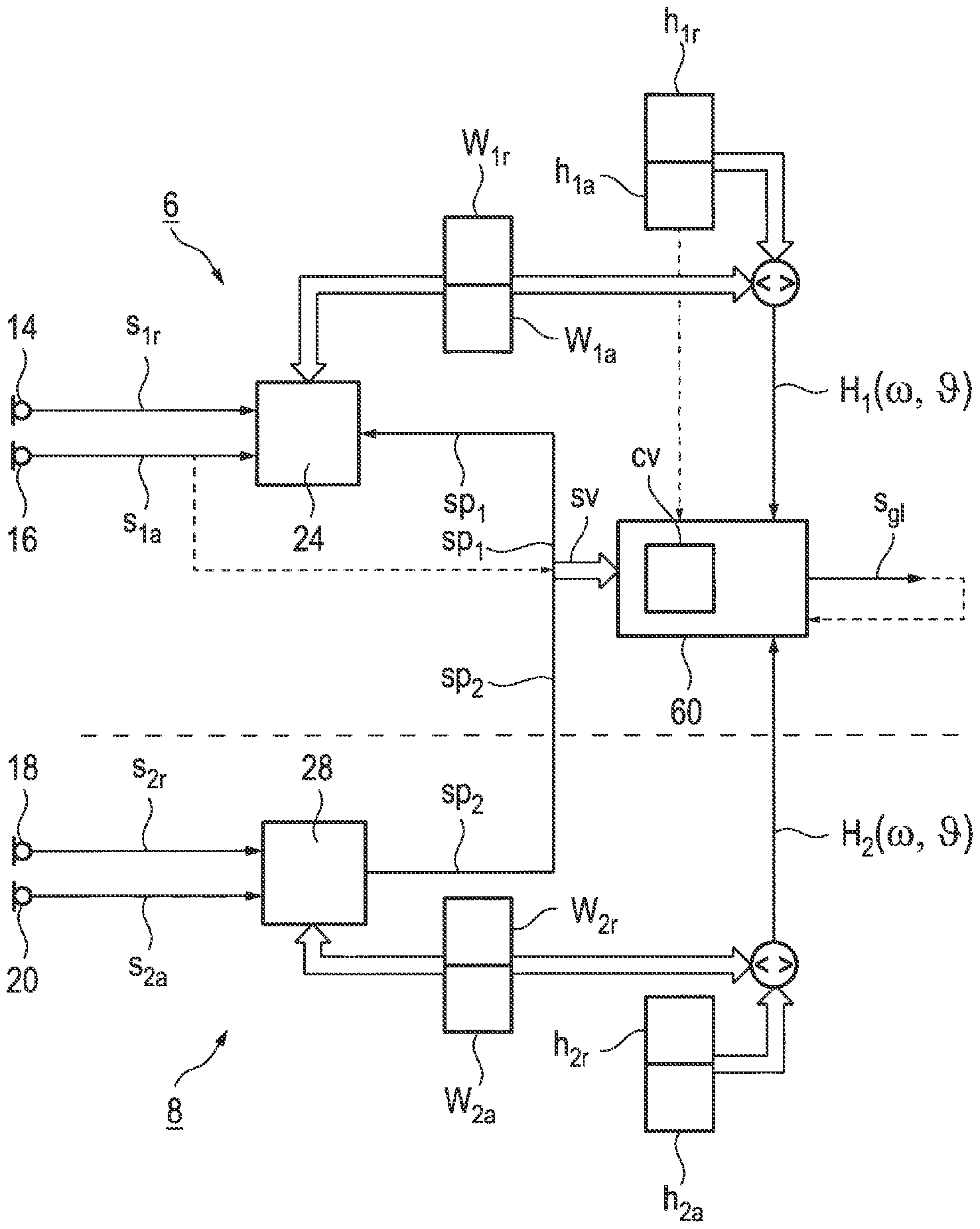
FIGS. 3 and 4 show schematic block diagrams of a method for operating the binaural hearing system to FIG. 1 in the environment shown in FIG. 2.

In FIG. 3, a block diagram of the signal flow of a method for operating the hearing system 1 according to FIG. 1 in the environment 35 according to FIG. 2 is shown. For the direction-sensitive pre-processing 24, a first reference pre-processing coefficient $w_{1r}$ and a first auxiliary pre-processing coefficient $w_{1a}$ are provided, and for the direction-sensitive pre-processing 28, a second reference pre-processing coefficient $w_{2r}$ and a second auxiliary pre-processing coefficient $w_{2a}$ are provided. The first and second reference and auxiliary pre-processing coefficients $w_{1r}$, $w_{1a}$, $w_{2r}$, $w_{2a}$ may either be fixed (and loaded for the local pre-processing from a respective memory in the first and second hearing device), or adaptive, as mentioned above. The first pre-processed signal $sp_1$ is then generated as a linear combination of the first reference and auxiliary signal $s_{1r}$, $s_{1a}$, weighted by the first reference and auxiliary pre-processing coefficients $w_{1r}$, $w_{1a}$, i.e., $sp_1=w_{1r}s_{1r}+w_{1a}s_{1a}$, while the second pre-processed signal $sp_2$ is given by $sp_2=w_{2r}s_{2r}+w_{2a}s_{2a}$, in an analogous way. All involved signals and coefficients are frequency dependent (which has been suppressed). In order to have the fixed notch in the first null direction 44 or an adaptive attenuation notch in direction of the interferer 46 of FIG. 2, the first reference and auxiliary pre-processing coefficient $w_{1r}$, $w_{1a}$ may comprise respective frequency-dependent phase factors for generating the proper directional characteristic 45 or 47, respectively, for the first pre-processed signal $sp_1$ (a similar reasoning applies to the second pre-processed signal $sp_2$). Note that all signals, coefficients and transfer functions may generally be complex-valued.

In order to perform the direction-sensitive signal processing task by means of the first and second pre-processed signal $sp_1$, $sp_2$ in the first hearing device 6, the task being, e.g., a source localization or the generation of a global beamformer signal, a first head related transfer function $H_1$ and a second head related transfer function $H_2$ are provided in a way yet to be described. The first and second head related transfer function $H_1(\omega, \theta)$, $H_2(\omega, \theta)$ are intrinsically frequency-dependent (hence, the variable ω), and represent the propagation of a sound signal from a given angle θ towards the first and second hearing device 6, 8, respectively, taking into account head shadowing effects and the positions of the microphones of the respective hearing device 6, 8 with respect to the head 31 and the ear (in particular, the ipsilateral pinna) of the user 21. Due to this information on the propagation of sound in the direct vicinity of the head 31 of the user 21, the first and second head related transfer function $H_1(\omega, \theta)$, $H_2(\omega, \theta)$ will be used for the direction-sensitive signal processing task, as well as the locally pre-processed signals $sp_1$, $sp_2$.

In order to derive the first and second head related transfer functions $H_1$, $H_2$, respective frequency- and angle-dependent first and second reference and auxiliary head related transfer functions $h_{1r}$, $h_{1a}$, $h_{2r}$, $h_{2a}$ are provided for each of the first reference microphone 14, the first auxiliary microphone 16, the second reference microphone 18 and the second auxiliary microphone 20. Wherein the first and second reference and auxiliary head related transfer functions $h_{1r}$, $h_{1a}$, $h_{2r}$, $h_{2a}$ take into account the head (and possibly pinna) shadow effects for sound that propagates from the angle θ with respect to the global direction of preference 54 towards the corresponding microphone position on or at the head 31 of the user 21.

The first head related transfer function $H_1$ is derived from the first reference and auxiliary head related transfer function $h_{1r}$, $h_{1a}$ in dependence on the first reference and auxiliary pre-processing coefficients $w_{1r}$, $w_{1a}$, in the same linear dependence as the first pre-processed signal $sp_1$:

$$H_1(\omega,\theta)=w_{1r}(\omega)h_{1r}(\omega,\theta)+w_{1a}(\omega)h_{1a}(\omega,\theta).$$

In a similar way, the second head related transfer function $H_2$ is derived from the second reference and auxiliary head related transfer function $h_{2r}$, $h_{2a}$ in dependence on the second reference and auxiliary pre-processing coefficients $w_{2r}$, $w_{2a}$:

$$H_2(\omega,\theta)=w_{2r}(\omega)h_{2r}(\omega,\theta)+w_{2a}(\omega)h_{2a}(\omega,\theta).$$

Now, a direction-sensitive signal processing task 60 is performed on the first pre-processed signal $sp_1$ and the second pre-processed signal $sp_2$, wherein for performing the task 60 locally in the first device 6, the second pre-processed signal $sp_2$ is transmitted to the first device 6 (indicated in FIG. 3 by the domain enclosed by the dashed line).

For a direction-sensitive pre-processing 28, with adaptive second reference and auxiliary pre-processing coefficients $w_{2r}$, $w_{2a}$, due to the dependence of the adaptive coefficients on the second reference and/or auxiliary signal $s_{2r}$, $s_{2a}$ generated in the second hearing device 8, these coefficients cannot be stored locally in the first hearing device 6, but their spatial information must be somehow transmitted from the second hearing device 8 to the first hearing device 6. As for the direction-sensitive signal processing task 60, only the second head related transfer function $H_2$ is needed (which depends on the second reference and auxiliary pre-processing coefficients $w_{2r}$, $w_{2a}$), it is sufficient to transmit the second head related transfer function $H_2$ (together with the second pre-processed signal $sp_2$) from the second hearing device 8 to the first hearing device 6 for performing the task 60 in the first hearing device 6.

The task 60 may be given by any directional processing that involves the first and second pre-process signal $sp_1$, $sp_2$, as well as the first and second head related transfer function $H_1$, $H_2$. In particular, during as a result of the task 60, and/or during an intermediate step (dashed feedback loop), a globally-processed signal $s_{gl}$ may be generated as $$s_{gl}(\omega,\theta_0)=c_1(\omega,\theta_0,H_1,H_2)sp_1(\omega)+c_2(\omega,\theta_0,H_1,H_2)sp_2(\omega)$$

wherein $c_1$ and $c_2$ represent frequency-dependent coefficients for the generation of the globally-processed signal $s_{gl}$ which, in general, both also depend on the first and second head related transfer function $H_1$, $H_2$, as well as on a spatial direction $\theta_0$ with respect to which a specific signal processing task is performed.

Among other examples, the globally-processed signal $s_{gl}$ may be given by a binaural beamformer signal (pointing towards the direction of preference $\theta_0$) or by a so-called notch-filtered signal $s_n$ which shows a maximal (and ideally total) attenuation towards the direction $\theta_0$. A suitable set of such notch-filtered signals $s_n$ may be used for determining the location of a sound source, by scanning the total space with the notch-filtered signals $s_n$ (and varying the notch angle $\theta_0$ for the scan).

Generally, the globally-processed signal $s_{gl}$ can be represented as a scalar product of a signal vector $sv=[sp_1, sp_2]^T$ containing the two pre-processed signals $sp_1$, $sp_2$ and a coefficient vector $cv=[c_1, c_2]^T$ containing the coefficients $c_1(\omega, \theta_0, H_1, H_2)$ and $c_2(\omega, \theta_0, H_1, H_2)$. In normal circumstances, by design of the task 60 both of the coefficients $c_1$ and $c_2$ show a functional dependence on two different head related transfer functions $h_{1g}$, $h_{2g}$, each of which representing a different side of the head, and thus, a different ear for a corresponding hearing device's location, i.e., $c_1=c_1(h_{1g}, h_{2g})$ and $c_2=c_2(h_{1g}, h_{2g})$, where $h_{1g}$ may represent the first reference or auxiliary head related transfer function $h_{1r}$, $h_{1a}$ or a generic head related transfer function for the first hearing device (similar for $h_{2g}$).

Then, for the task 60, the first and second head related transfer functions $H_1$, $H_2$ are normalized with respect to $H_1$ and used in the general formulas for $c_1$ and $c_2'$, i.e., $c_1(h_{1g}, h_{2g}) \mapsto c_1(\mathbf{1}, H_2/H_1)$.

The task 60 may also involve one or more further signals, e.g., the first reference signal $s_{1r}$ and/or the first auxiliary signal $s_{1a}$ (c.f. dotted arrow from the first auxiliary signal $s_{1a}$ towards the signal vector sv), and/or also another locally pre-processed signal the first, preferably generated in an analogous way as the first and second pre-processed signal $sp_1$ and $sp_2$. In such a case of more than two signals for the task 60, the signal vector sv has three (or four or more) components, and the coefficient vector cv is to be constructed accordingly to match the dimension of sv. For the first auxiliary signal $s_{1a}$, e.g., a corresponding dependence on $h_{1a}/H_1$ (c.f. dotted line) can be implemented in the coefficients $c_1$, $c_2$, $c_3$ (and possibly further coefficients). Likewise, for another locally pre-processed signal, a corresponding head related transfer function shall be used, in an analogous way as the first and second head related transfer functions $H_1$ and $H_2$, along with the normalization over $H_1$ mentioned above.

Figure 4:
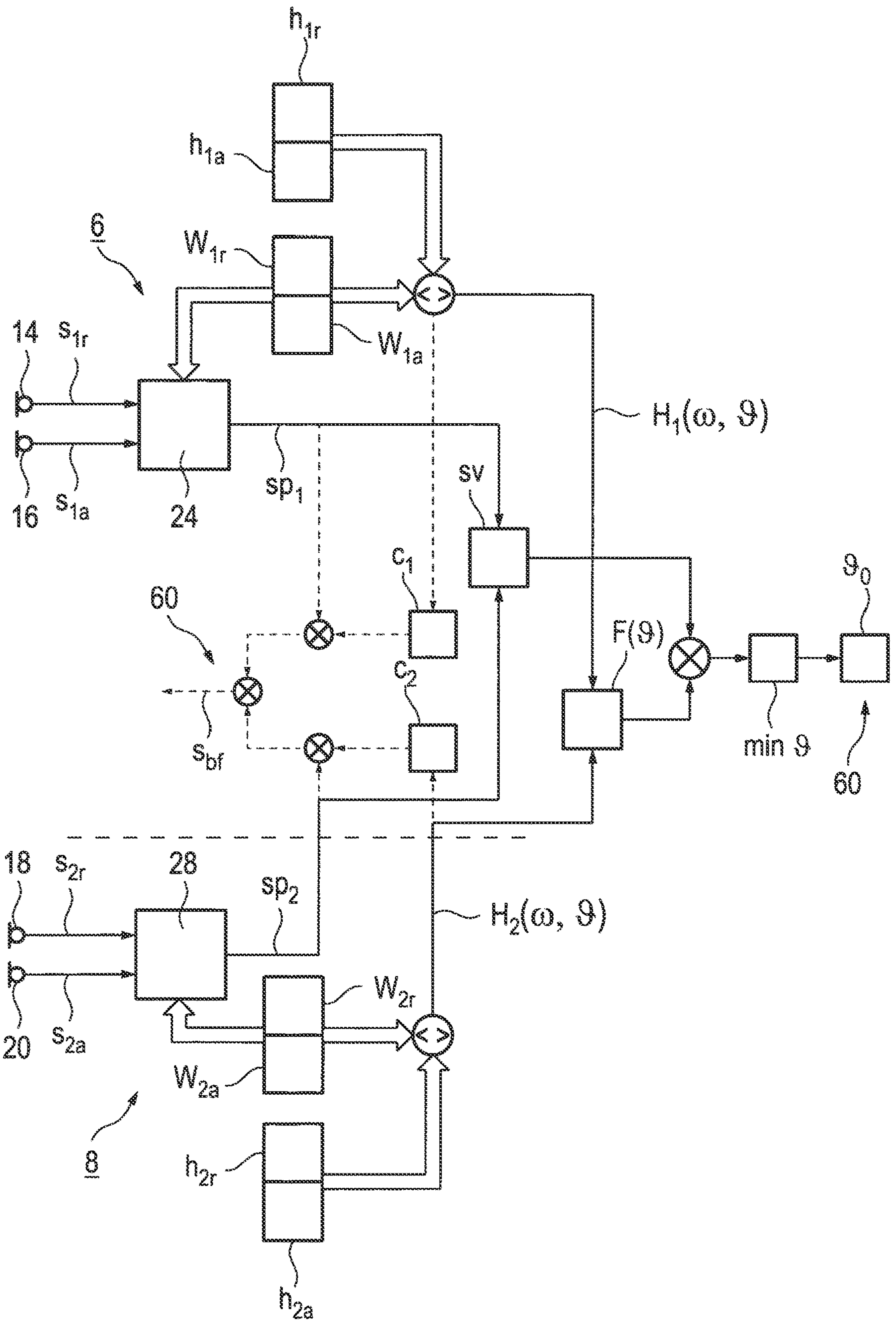

In FIG. 4, two examples for the task 60 are shown. In the first example, the task 60 is given by a generation of the binaural beamformer signal $s_{bf}$ (see dashed signal flow) pointing towards a specific direction $\theta_0$. In this case, the respective signal contribution of the first and second pre-processed signal $sp_1$, $sp_2$ also has to be filtered with respective filter coefficients $c_1$ and $c_2$ (as given above) involving the corresponding first or second head related transfer function $H_1$, $H_2$, in order to properly account for the head shadowing effects of sound originating from the direction $\theta_0$ towards which the beamformer signal $s_{bf}$ shall be directed.

However, the direction-sensitive signal processing task 60 may also be given by the localization of an a priori unknown angle $\theta_0$ of a sound source (taken with respect to a global direction of preference such as a frontal direction of the hearing system 1).

To this end, a set of angle-dependent spatial filters F (θ) is formed by coefficient vectors cv(θ) as given above from the first and second head related transfer function $H_1$, $H_2$. Each of the spatial filters F (θ) effectively forms a notch in the direction θ corresponding to the argument, and scanning the entire space surrounding the user 21 of the hearing device 1 by incrementing the angle argument θ of the filters F (θ) (e.g., by 10° or 15° or 20° in each incremental step). Then, each of the spatial filters F (θ) is applied as its respective coefficient vector cv (c.f. above) to the signal vector $sv=[sp_1, sp_2]^T$, i.e., to the first and second pre-processed signal. The angle $\theta_0$ of the sound source of interest then corresponds to the spatial filter F $(\theta_0)$ with the minimum signal energy of the filtered signal vector, i.e., to the spatial filter which blocks most of the signal energy out of the first and second pre-processed signal $sp_1$, $sp_2$.

Then, the spatial filters F (θ) may be derived by imposing additional constraints on an additional source direction, e.g., by setting a gain in frontal direction (0°). The spatial filter F (θ) can then be described by $$F(\theta)=M(M^H M)^{-1} g^*,$$

where the gain constraint vector g and the normalized constraint coefficient matrix M may be given by $$g=\begin{bmatrix} g_0 \\ g_\theta \end{bmatrix},\ M=\begin{bmatrix} H_1(0^\circ)/H_1(0^\circ) & H_1(\theta)/H_1(\theta) \\ H_2(0^\circ)/H_1(0^\circ) & H_2(\theta)/H_1(\theta) \end{bmatrix}=\begin{bmatrix} 1 & 1 \\ H_{21}(0^\circ) & H_{21}(\theta) \end{bmatrix}$$

with the normalized gain constraints $g_0$, $g_\theta$ representing the gain at 0° and at the angle θ, respectively (e.g., $g_0=1$, $g_\theta=0$), and $H_{21}(0^\circ)$ being the quotient $H_2(0^\circ)/H_1(0^\circ)$ (and likewise for θ, wherein the frequency dependence of $H_1$, $H_2$ has been omitted). In case that three or more signals are used for the task 60, the gain constraint vector g is a three or more component vector, wherein for each spatial filter F (θ), the total number of constraints shall match the total number of local and/or locally pre-processed signals used for the implementation of the task 60.

The designed spatial filter F(θ) is applied to the signal vector $sv=[sp_1, sp_2]^T$ as the scalar product $F^H(\theta)$ sv. In this example, the spatial filter F(θ) is designed to have maximum attenuation at a source angle $\theta_0$ and distortionless response at the frontal source direction (0°) based on the gain constraints $g_\theta$ and $g_0$, respectively.

The angle $\theta_0$ of a dominant sound source can then be determined, at least as an approximation, by the angle θ for which the corresponding spatial filter F(θ) applied to the signal vector $sv=[sp_1, sp_2]^T$ as the scalar product $F^H(\theta)\cdot sv$ minimizes the total energy.

Even though the invention has been illustrated and described in detail with help of a preferred embodiment example, the invention is not restricted by this example. Other variations can be derived by a person skilled in the art without leaving the extent of protection of this invention.

The following is a summary list of reference numerals and the corresponding structure used in the above description of the invention:

1 hearing system
2 binaural hearing system
6 first hearing device
8 second hearing device
14 first reference microphone
16 first auxiliary microphone
18 second reference microphone
20 second auxiliary microphone
22 environment sound
24 direction-sensitive pre-processing
26 first local beamformer
28 direction-sensitive pre-processing
30 first local beamformer
32 left side
34 right side
36 first frontal direction
40 second frontal direction
44 first null direction
45 directional characteristic
46 interferer
47 directional characteristic
50 (dominant) sound source
52 angular source direction
54 global direction of preference
55 directional characteristic
60 direction-sensitive signal processing task
cv coefficient vector
F spatial filter
g gain constraints $h_{1r}$ first reference head related transfer function
$h_{1a}$ first auxiliary head related transfer function
$h_{2r}$ second reference head related transfer function
$h_{2a}$ second auxiliary head related transfer function
$H_1$ first head related transfer function
$H_2$ second head related transfer function
$s_{1r}$ first reference signal
$s_{1r}$ first auxiliary signal
$s_{2r}$ second reference signal
$s_{2a}$ second auxiliary signal
$s_{bf}$ beamformer signal
$s_{gl}$ globally-processed signal
$sp_1$ first pre-processed signal
$sp_2$ second pre-processed signal
sv signal vector
$w_{1r}$ first reference pre-processing coefficient
$w_{1a}$ first auxiliary pre-processing coefficient
$w_{2r}$ second reference pre-processing coefficient
$w_{2a}$ second auxiliary pre-processing coefficient

The invention claimed is:

1. A method for operating a hearing system, the hearing system having a first hearing device and a second hearing device, the first hearing device having at least a first reference microphone and a first auxiliary microphone, and the second hearing device having a plurality of second microphones, which comprises the following steps:

performing, via the first hearing device, the substeps of:

generating a first reference signal and a first auxiliary signal from an environment sound via the first reference microphone and the first auxiliary microphone, respectively;

generating a first pre-processed signal by applying a direction-sensitive pre-processing to the first reference signal and the first auxiliary signal, by means of corresponding first reference and first auxiliary pre-processing coefficients, respectively;

providing for the first reference microphone and the first auxiliary microphone, a first reference head related transfer function and a first auxiliary head related transfer function, being representative of a propagation of a generic sound signal from a given angle towards the first reference microphone and the first auxiliary microphone when the first hearing device is mounted on a head of a user; and deriving a first head related transfer function, representative of the propagation of the generic sound signal from the given angle towards the first hearing device when the first hearing device is mounted on the head of the user, from the corresponding first reference and first auxiliary pre-processing coefficients and from the first reference and auxiliary head related transfer functions;

performing, via the second hearing device, the substeps of:

generating a second pre-processed signal by means of the plurality of second microphones, the second pre-processed signal being representative of the environment sound;

providing a second position related transfer function, representative of the propagation of the generic sound signal from the given angle towards the second hearing device when the second hearing device is mounted at a specific location; and performing a direction-sensitive signal processing task on the first pre-processed signal and the second pre-processed signal, using the first head related transfer function and the second position related transfer function for the direction-sensitive signal processing task;

wherein the plurality of second microphones of the second hearing device includes at least a second reference microphone and a second auxiliary microphone, performing, via the second hearing device, the further steps of:

generating a second reference signal and a second auxiliary signal from the environment sound by the second reference microphone and the second auxiliary microphone, respectively;

generating a second pre-processed signal by applying a direction-sensitive pre-processing to the second reference signal and the second auxiliary signal by means of corresponding second reference and second auxiliary pre-processing coefficients, respectively; and providing the second reference microphone and the second auxiliary microphone, a second head related transfer function and second auxiliary head related transfer function, representative of the propagation of the generic sound signal from the given angle towards the second reference microphone and the second auxiliary microphone when the second hearing device is mounted on the head of the user, a second head related transfer function is given as the second position related transfer function by derivation from the corresponding second reference and second auxiliary pre-processing coefficients and from the second head related transfer function and the second auxiliary head related transfer function;

wherein as the direction-sensitive signal processing task, an angle of a sound source is determined and/or a beamformer signal is generated, the beamformer signal containing signal contributions from the first and second pre-processed signals; and wherein for determining the angle of the sound source, a set of spatial filters is generated by means of the first and second head related transfer functions, each of the spatial filters forming an attenuation notch in space towards a different angle.

2. The method according to claim 1, wherein for the direction-sensitive signal processing task, the first head related transfer function is used as a correction to the first reference head related transfer function or the first auxiliary head related transfer function.

3. The method according to claim 1, wherein the first head related transfer function and the first pre-processed signal have a same functional dependence on the corresponding first reference and first auxiliary pre-processing coefficients, respectively.

4. A hearing system, comprising:

a first hearing device having at least a first reference microphone and a first auxiliary microphone;

a second hearing device having at least a plurality of second microphones;

a controller with at least one signal processor; and wherein the hearing system is configured to perform the method according to claim 1.

5. The hearing system according to claim 4, wherein the hearing system is configured as a binaural hearing system, wherein said first hearing device and said second hearing device are configured to be worn by the user on and/or at different ears during operation of said binaural hearing system.

6. A method for operating a hearing system, the hearing system having a first hearing device and a second hearing device, the first hearing device having at least a first reference microphone and a first auxiliary microphone, and the second hearing device having a plurality of second microphones, which comprises the following steps:

performing, via the first hearing device, the substeps of:

generating a first reference signal and a first auxiliary signal from an environment sound via the first reference microphone and the first auxiliary microphone, respectively;

generating a first pre-processed signal by applying a direction-sensitive pre-processing to the first reference signal and the first auxiliary signal, by means of corresponding first reference and first auxiliary pre-processing coefficients, respectively;

providing for the first reference microphone and the first auxiliary microphone, a first reference head related transfer function and a first auxiliary head related transfer function, being representative of a propagation of a generic sound signal from a given angle towards the first reference microphone and the first auxiliary microphone when the first hearing device is mounted on a head of a user; and deriving a first head related transfer function, representative of the propagation of the generic sound signal from the given angle towards the first hearing device when the first hearing device is mounted on the head of the user, from the corresponding first reference and first auxiliary pre-processing coefficients and from the first reference and auxiliary head related transfer functions;

performing, via the second hearing device, the substeps of:

generating a second pre-processed signal by means of the plurality of second microphones, the second pre-processed signal being representative of the environment sound;

providing a second position related transfer function, representative of the propagation of the generic sound signal from the given angle towards the second hearing device when the second hearing device is mounted at a specific location; and performing a direction-sensitive signal processing task on the first pre-processed signal and the second pre-processed signal, using the first head related transfer function and the second position related transfer function for the direction-sensitive signal processing task;

the first head related transfer function and the first pre-processed signal having a same functional dependence on the corresponding first reference and first auxiliary pre-processing coefficients, respectively;

deriving the first head related transfer function as a linear combination of the first reference head related transfer function and the auxiliary head related transfer function, weighted by the corresponding first reference and first auxiliary pre-processing coefficients, respectively; and generating the first pre-processed signal as a linear combination of the first reference signal and the auxiliary signal, weighted by the corresponding first reference and first auxiliary pre-processing coefficients.

7. The method according to claim 1, wherein for generating the first pre-processed signal in the first hearing device, fixed first reference and first auxiliary pre-processing coefficients are used.

8. The method according to claim 1, wherein for generating the first pre-processed signal in the first hearing device, adaptive first reference and first auxiliary pre-processing coefficients are used, in dependence on the first reference signal and/or the first auxiliary signal.

9. The method according to claim 8, wherein:

for generating the second pre-processed signal in the second hearing device, adaptive second reference and second auxiliary pre-processing coefficients are used, in dependence on the second reference signal and/or the second auxiliary signal; and for performing the direction-sensitive signal processing task in the first hearing device, the adaptive second reference and second auxiliary pre-processing coefficients are transmitted from the second hearing device to the first hearing device.

10. The method according to claim 6, wherein for the direction-sensitive signal processing task, the first head related transfer function is used as a correction to the first reference head related transfer function or the first auxiliary head related transfer function.

11. The method according to claim 6, wherein for generating the first pre-processed signal in the first hearing device, fixed first reference and first auxiliary pre-processing coefficients are used.

12. A hearing system, comprising:

a first hearing device having at least a first reference microphone and a first auxiliary microphone;

a second hearing device having at least a plurality of second microphones;

a controller with at least one signal processor; and wherein the hearing system is configured to perform the method according to claim 6.

13. A method for operating a hearing system, the hearing system having a first hearing device and a second hearing device, the first hearing device having at least a first reference microphone and a first auxiliary microphone, and the second hearing device having a plurality of second microphones, which comprises the following steps:

performing, via the first hearing device, the substeps of:

generating a first reference signal and a first auxiliary signal from an environment sound via the first reference microphone and the first auxiliary microphone, respectively;

generating a first pre-processed signal by applying a direction-sensitive pre-processing to the first reference signal and the first auxiliary signal, by means of corresponding first reference and first auxiliary pre-processing coefficients, respectively;

providing for the first reference microphone and the first auxiliary microphone, a first reference head related transfer function and a first auxiliary head related transfer function, being representative of a propagation of a generic sound signal from a given angle towards the first reference microphone and the first auxiliary microphone when the first hearing device is mounted on a head of a user; and deriving a first head related transfer function, representative of the propagation of the generic sound signal from the given angle towards the first hearing device when the first hearing device is mounted on the head of the user, from the corresponding first reference and first auxiliary pre-processing coefficients and from the first reference and auxiliary head related transfer functions;

performing, via the second hearing device, the substeps of:

generating a second pre-processed signal by means of the plurality of second microphones, the second pre-processed signal being representative of the environment sound;

providing a second position related transfer function, representative of the propagation of the generic sound signal from the given angle towards the second hearing device when the second hearing device is mounted at a specific location; and performing a direction-sensitive signal processing task on the first pre-processed signal and the second pre-processed signal, using the first head related transfer function and the second position related transfer function for the direction-sensitive signal processing task;

wherein the plurality of second microphones of the second hearing device includes at least a second reference microphone and a second auxiliary microphone, performing, via the second hearing device, the further steps of:

generating a second reference signal and a second auxiliary signal from the environment sound by the second reference microphone and the second auxiliary microphone, respectively;

generating a second pre-processed signal by applying a direction-sensitive pre-processing to the second reference signal and the second auxiliary signal by means of corresponding second reference and second auxiliary pre-processing coefficients, respectively; and providing the second reference microphone and the second auxiliary microphone, a second head related transfer function and second auxiliary head related transfer function, representative of the propagation of the generic sound signal from the given angle towards the second reference microphone and the second auxiliary microphone when the second hearing device is mounted on the head of the user, a second head related transfer function is given as the second position related transfer function by derivation from the corresponding second reference and second auxiliary pre-processing coefficients and from the second head related transfer function and the second auxiliary head related transfer function;

wherein:

for generating the first pre-processed signal in the first hearing device, adaptive first reference and first auxiliary pre-processing coefficients are used, in dependence on the first reference signal and/or the first auxiliary signal;

for generating the second pre-processed signal in the second hearing device, adaptive second reference and second auxiliary pre-processing coefficients are used, in dependence on the second reference signal and/or the second auxiliary signal; and for performing the direction-sensitive signal processing task in the first hearing device, the adaptive second reference and second auxiliary pre-processing coefficients are transmitted from the second hearing device to the first hearing device; and wherein for the first hearing device, a first frontal direction is defined as a direction from the first auxiliary microphone towards the first reference microphone, and wherein the first pre-processed signal is generated by applying the direction-sensitive pre-processing to the first reference signal and the auxiliary signal by means of the corresponding first reference and first auxiliary pre-processing coefficients, respectively, in a way that the first pre-processed signal shows a maximal attenuation for the generic sound signal originating from an angular range of [+90°, +270°] with respect to the first frontal direction.

14. The method according to claim 13, which further comprises generating the first pre-processed signal by means of an adaptive beamforming process employing the corresponding first reference and first auxiliary pre-processing coefficients.

15. A hearing system, comprising:

a first hearing device having at least a first reference microphone and a first auxiliary microphone;

a second hearing device having at least a plurality of second microphones;

a controller with at least one signal processor; and wherein the hearing system is configured to perform the method according to claim 13.

* * * * *